United States Patent Office 2,847,478
Patented Aug. 12, 1958

2,847,478

ALLYL TRANSETHERIFICATION

Jesse C. H. Hwa, Levittown, and Warren H. Watanabe, Philadelphia, Pa., assignors to Rohm & Haas Company, Philadelphia, Pa., a corporation of Delaware No Drawing. Application August 13, 1956
Serial No. 603,840

11 Claims. (Cl. 260—611)

This invention concerns a method for preparing allyl ethers of aliphatic, arylaliphatic, and cycloaliphatic alcohols by reacting diallyl ether with a said alcohol under the influence of a catalyst of mercury and a strong acid, which catalyst is soluble and ionizable in the reaction system.

The Williamson reaction or modifications thereof have provided ways for making some allyl ethers, although not in good yields. Low yields were also reported from reaction of allyl alcohol and lower alkanols under the influence of a catalyst comprising cuprous chloride, ammonium chloride, hydrochloric acid, copper, and water. But these and other prior art methods have left much to be desired in the way of producing allyl ethers.

Yet there are many situations in which these ethers can be of value as solvents, plasticizers, and chemical intermediates, including the preparation of polymers and copolymers and the forming of glycidyl ethers which may be used for forming valuable resins.

According to the process of this invention ethers of allyl alcohol and another aliphatic or cycloaliphatic or aryl-aliphatic alcohol, ROH, where R is alkyl, alkenyl, cycloalkyl, or aralkyl, are formed by reacting diallyl ether and a said alcohol under the influence of a catalyst composed of a salt of mercury and a strong acid, which salt is soluble and ionizable in the reaction system.

The process is usually carried out between 40° and 125° C. It is particularly convenient to effect the reaction of diallyl ether and alcohol at the refluxing temperature of the reaction mixture.

While diallyl ether and the reacting alcohol themselves may serve as solvents, they may be supplemented with an inert organic solvent such as benzene, toluene, xylene, naphtha, or other volatile hydrocarbon or a volatile chlorinated solvent such as ethylene dichloride or carbon tetrachloride.

The catalytic effectiveness of a considerable variety of mercury salts has been studied. The effectiveness of salts depends both upon the constituents and the form of the salt. Thus, mercury sulfate when finely ground acts as a catalyst, although this compound in the form of crystals as manufactured does not give sufficiently rapid action. Mercury sulfate as prepared by treating a mercury salt of a weak acid, such as mercury acetate or mercury benzoate, with sulfuric acid gives an effective and rapid-acting catalyst. The amount of sulfuric acid may be from about 10% to over 150% equivalent to the mercury salt. Likewise, a mercury salt of a carboxylic acid, such as the above, may be treated with a similar proportion of hydrofluoric acid or an "ansolvo acid" formed from boron trifluoride and an oxygenated organic compound.

As is known, boron trifluoride forms complexes with oxygen-containing organic compounds, including carboxylic acids, esters, ketones, aldehydes, alcohols, and ethers. These complexes in conjunction with a soluble mercury salt provide highly effective catalyst systems. The complex may be one such as $BF_3.(C_2H_5)_2O$ or $BF_3.(C_4H_9)_2O$ as formed by mixing boron trifluoride with one of the indicated ethers or other ether, or $$BF_3.2CH_3COOH$$

or $BF_3.2C_2H_5COOH$ as formed with a carboxylic acid, or $BF_3.2C_2H_5OH$ or $BF_3.2C_4H_9OH$ as formed with typical alcohols, or $BF_3.CH_3COCH_3$ or $BF_3.CH_3COC_2H_5$ as formed with typical ketones, or in general $BF_3.M_x$, where M represents an oxygenated organic compound, preferably of not over about twelve carbon atoms and $x$ represents the number of moles of such compound coordinated with one mole of $BF_3$, usually one or two. Of course, excess of the organic compound is permissible and may serve as a solvent. It may be further commented that boron trifluoride itself may be added directly to the reaction mixture and the coordinated complex there formed, as there are, of course, alcohols and ethers present.

In place of addition of a strong acid to a soluble salt there may be added an acidic salt of a strong acid, for example, ferrous ammonium sulfate or ferrous sulfate and sulfuric acid, or silver nitrate. The catalyst formed by mixing mercury acetate or benzoate and silver nitrate has proved to be quite effective. In place of the mercury salt used above there may be mixed mercuric oxide and a strong acid, such as sulfuric acid, hydrofluoric acid, a coordinated complex of boron trifluoride or boron trifluoride itself, which forms a coordinated complex with components of the reaction mixture. In fact any boron trifluoride coordinated complex can be used.

The strong acids, including the ansolvo acids mentioned above, do not by themselves provide the necessary catalytic action. Similarly, the mercury carboxylates or mercury oxide by themselves fail to promote the reaction. This is also true of mercury phosphate which is insoluble in the reaction system or mercury bromide or chloride which appear insoluble or at least unionized in the mixture.

There are needed only relatively small amounts of mercury compound and strong acid for promotion of the desired transetherification. Thus, there may be used from about 0.5 to about five mole percent of mercury compound per mole of diallyl ether. A larger proportion may be added, if so desired, particularly when multiple additions of mercury catalyst (including strong acid) are made. This procedure is often highly advantageous, as it has been observed that the extent of conversion often depends upon having active catalyst present in the reaction mixture rather than upon some equilibrium and the catalyst may be deactivated as reaction proceeds. The alcohols which are etherified with diallyl ether include alkanols generally from methyl through butyl, octyl, and dodecyl to and beyond octadecyl alcohols. Primary and secondary alcohols react best and tertiary alcohols respond but poorly, as is also true for phenols. Alkenols react like alkanols and beyond allyl alcohol in this series there can be used crotyl, 3-butenyl, 4-pentenyl, 5-hexenyl, 10-undecenyl, or oleyl and similar primary and secondary alkenols. Cycloaliphatic alcohols are also reactive in the described system and there may be used cyclopentyl, cyclohexyl, methylcyclohexyl, hexahydrobenzyl, dicyclopentanyl, or terpenyl alcohols with moderately good yields of the corresponding allyl cycloalkyl ethers. The aralkyl derivatives are readily prepared by reaction of diallyl ether and benzyl alcohol, methylbenzyl alcohol, butylbenzyl alcohol, phenylethanol, and the like.

Alcohols like the above but containing an ether linkage or linkages may likewise be used. There may thus be used methoxyethanol, ethoxyethanol, ethoxypropanol, butoxyethanol, dodecyloxyethanol, ethoxyethoxyethanol, dodecyloxyethoxyethanol, phenoxyethanol, phenoxyethoxyethanol, octylphenoxyethanol, octylphenoxypolyethoxyethanol, benzoxyethanol, cyclohexoxyethanol, and so on. The polyethoxyethanols having a terminal hydrocarbon group of sufficient size to impart a hydrophobic balance, as octylphenyl, or dodecyl, provide a most interesting group of products when there is introduced a terminal allyl ether group and which, although of good surface-activity, do not cause objectionable foam in aqueous solutions. Thus, alkyl phenoxypolyethoxyethanols having three to twenty-two carbon atoms in the hydrophobic portion and five to one hundred ether groups can be reacted to introduce a terminal allyl group.

Additional details of useful, typical procedures are presented in the following examples, which are given for purposes of illustration and not by way of limitation. Parts are by weight unless otherwise designated.

*Example 1*

A mixture of 32 parts of methyl alcohol and 60 parts of diallyl ether was prepared and one part of boron trifluoride-etherate, together with four parts of mercuric acetate were dissolved therein. The resulting solution was placed on a distilling column and material slowly distilled off at such a rate as to keep the distillation temperature at less than 42.0° C. After about five hours of slow fractional distillation, the pot contents were cooled and an additional amount of catalyst, consisting of 0.5 part of boron trifluoride and two parts of mercuric acetate, was dissolved in the solution. Distillation was resumed and continued until no further distillate coming over below 45° C. could be removed.

The resulting distillate was treated with calcium hydride to remove unreacted methyl alcohol, and then distilled out of fresh calcium hydride using xylene as a chaser. There was obtained 48 parts of allyl methyl ether, a yield of 67%. Final purification of this product was effected by careful treatment with phosphoric anhydride, giving pure allyl methyl ether, boiling point 42° C., $n_D^{25}$, 1.3764.

*Example 2*

A solution of 135 parts of n-octadecyl alcohol in 85 parts of benzene was prepared and in this solution there was dissolved in order 46.6 parts of diallyl ether, 2.0 parts of mercuric acetate, and 1.0 part of boron trifluoride-etherate. The solution was heated under reflux and the reflux condensate led through a continuous water separator. After three hours reflux, three parts of an aqueous layer had separated. An additional increment of catalyst, comprising 2.0 parts mercuric acetate and 1.0 part boron trifluoride-etherate was then added to the reaction mixture and reflux continued until another 1.5 parts of an aqueous layer had been removed.

In order to remove unreacted octadecyl alcohol, five parts of boric acid was dissolved in the reaction mixture and reflux resumed as before until no further aqueous layer could be removed. In this manner, all unreacted alcohol was converted to the borate ester. The reaction mixture was then stripped of its volatile components by heating the mixture to 97° C. under 0.35 mm. Hg pressure. The residue was then distilled, yielding 110.2 parts of allyl octadecyl ether, boiling point 146°–152° C./0.30 mm., a yield of 71%, based on octadecyl alcohol.

In the same way other alkanols can be used to give the corresponding allyl alkyl ethers. Typical of these are allyl butyl ether (from n-butanol), distilling at 64°–65° C./120 mm.; allyl octyl ether, distilling at 90°–93° C./15 mm.; allyl cetyl ether (from cetyl alcohol), distilling at 105°–176° C./7 mm. and melting at 25° C. as recrystallized from ethanol; allyl 3-methyl-hexyl ether, distilling at 70° C./18 mm.; allyl 3,5,5-trimethyl-hexyl ether, distilling at 66° C./8 mm.; and allyl dodecyl ether (from lauryl alcohol), distilling at 100° C./1 mm.

In place of an alkanol there may be substituted an alkenol (other than allyl alcohol). The procedure already described in detail leads to allyl alkenyl ethers, such as allyl 3-methyl-3-butenyl ether (from 3-methyl-3-buten-1-ol), distilling at 132°–136° C.; allyl 5-pentenyl ether (from 5-pentenol), distilling at 135°–140° C.; allyl isododecenyl ether (from 5,5,7,7-tetramethyl-2-octenyl alcohol), distilling at 118°–122° C./5 mm.; allyl 9-octadecenyl ether (from 9-octadecenol), distilling at 205°–215° C./15 mm.

*Example 3*

There are dissolved 1.5 parts of $BF_3$-etherate and two parts of mercuric acetate in a mixture of 99 parts of cyclohexanol, 59 parts of diallyl ether, and 86 parts of benzene. This solution is heated under reflux and the reflux condensate collected in a continuous water separator. As soon as water separation slows down, further increments of the $BF_3$-mercuric acetate catalyst equal in amount to that originally added to the reaction mixture are added. After 1.5 hours' reflux, the first increment is added; after 2.5 hours' reflux, the second increment is added; after 3.5 hours, the third and final increment is added and reflux continued for an additional three hours. To the reaction mixture there is then added ten parts of boric acid and reflux with separation of water, again resumed. After water separation has ceased, the pot contents are flash-distilled at 0.5 mm. and a maximum pot temperature of 82° C. into a chilled receiver.

The flash-off distillate is fractionally distilled, giving 81.3 parts of pure allyl cyclohexyl ether, boiling point 79°–84° C./38 mm., a yield of 58% based on cyclohexanol.

*Example 4*

There are dissolved two parts of boron trifluoride-dibutyl ether complex, two parts of mercuric oxide, 108 parts of benzyl alcohol, 60 parts of diallyl ether, and 50 parts of toluene. The solution is heated under reflux with continuous separation of water. After about two hours addition is made of two parts of the boron trifluoride-dibutyl ether complex and of mercuric oxide. Heating is continued and after another two hours another two parts of each are added with further reflux and separation of water. When water is no longer evolved, the reaction mixture is flash-distilled at 1 mm. pressure and a maximum pot temperature of 100° C. into a receiver chilled with solid carbon dioxide and acetone. The flash-distillate is fractionally distilled. Ether and alcohol are removed in a fraction of 110 parts at 70°–75° C./5 mm. This is treated with ten parts of boric acid in 50 parts of benzene and heated under reflux with separation of water. The reaction mixture is then fractionally distilled to give 80 parts of allyl benzyl ether, distilling at 70°–71° C./5 mm.

The methods which have been illustrated in the above examples can be applied to any of the non-tertiary alcohols with good results and it is unnecessary to give the details for each and every preparation. Experience has shown that the transetherification of diallyl ether and an alcohol is widely applicable and can be used to produce allyl ethers not readily otherwise prepared.

The transetherification principle can be applied to the reaction of allyl alkyl ethers and alcohols different from that corresponding to the alkyl group of the ether whenever there results an allyl ether which distills in a range sufficiently different from that of the other materials in the reaction mixture. In a practical way this limits this type of transetherification to the preparation of allyl ethers of methyl, ethyl, and n-propyl alcohols.

With regard to the preparation of diallyl ether a procedure has been developed which is described in another application and which provides a satisfactory way of making this ether. The same catalysts are used as above described. Allyl alcohol is reacted with dehydration to give the desired diallyl ether. A typical preparation follows, but any of the other described catalysts can be used with like outcome.

A solution is prepared of 1.5 parts of $BF_3 \cdot (C_2H_5)_2O$ (45% of $BF_3$) and four parts of mercuric acetate in 116 parts of allyl alcohol and 68 parts of n-hexane. It is heated under reflux with continuous separation of water. Over a five hour period of refluxing a total of 24 parts of water is separated. The reaction mixture is cooled and ten parts of boric acid added. This mixture is heated to reflux for 3.5 hours, when evolution of water ceases. The mixture is flash-distilled under low pressure into a solid carbon dioxide chilled receiver with a maximum pot temperature of 12° C. The flash-distillate is fractionally distilled at atmospheric pressure to give 45.2 parts of pure diallyl ether, distilling at 94°–94.8° C. It contains by analysis 73.43% of carbon and 10.13% of hydrogen (theory 73.43% and 10.27% respectively) and has a refractive index, $n_D^{25}$, of 1.4134 and a density, $d_4^{25}$, of 0.8027.

We claim:

1. A process for preparing allyl ethers which comprises reacting diallyl ether with a non-tertiary alcohol, other than alkenols having less than four carbon atoms and alkynols, in the temperature range of about 40° to 125° C. in the presence of a catalyst that is soluble and ionizable in the reaction system, said catalyst consisting of a soluble mercury salt and a strong acid-acting agent.

2. A process for preparing allyl ethers which comprises reacting diallyl ether with a non-tertiary alcohol, other than alkenols having less than four carbon atoms and alkynols, in the temperature range of about 40° to 125° C. in the presence of a catalyst that is soluble and ionizable in the reaction system, said catalyst consisting of a soluble mercury salt and a strong acid-acting agent from the class consisting of sulfuric acid, hydrofluoric acid, boron trifluoride, and boron trifluoride coordinated complexes.

3. A process for preparing allyl ethers which comprises reacting diallyl ether with a non-tertiary alcohol, other than alkenols having less than four carbon atoms and alkynols, at the reflux temperature with separation of water formed in the presence of a catalyst that is soluble and ionizable in the reaction system, said catalyst consisting of a soluble mercury salt and a strong acid-acting agent.

4. A process for preparing allyl ethers which comprises reacting diallyl ether with a non-tertiary alcohol in the temperature range of about 40° to 125° C. in the presence of a catalyst that is soluble and ionizable in the reaction system, said catalyst consisting of a soluble mercury salt and a strong acid-acting agent, said non-tertiary alcohol being selected from the group consisting of alkanols, alkenols having at least four carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

5. A process for preparing allyl ethers which comprises reacting diallyl ether with a non-tertiary alcohol in the temperature range of about 40° to 125° C. in the presence of a catalyst that is soluble and ionizable in the reaction system, said catalyst consisting of a soluble mercury salt and a strong acid-acting agent from the class consisting of sulfuric acid, hydrofluoric acid, boron trifluoride, and boron trifluoride coordinated complexes, said non-tertiary alcohol being selected from the group consisting of alkanols, alkenols having at least four carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

6. A process for preparing allyl ethers which comprises reacting diallyl ether with a non-tertiary alcohol at the reflux temperature with separation of water formed from the class consisting of sulfuric acid, hydrofluoric acid, boron trifluoride, and boron trifluoride coordinated complexes, said non-tertiary alcohol being selected from the group consisting of alkanols, alkenols having at least four carbon atoms, cycloalkanols, alkylcycloalkanols, dicycloalkanols, terpenols, arylalkanols, alkylarylalkanols, alkoxyalkanols, aryloxyalkanols, alkylaryloxyalkanols, and alkylarylpolyethoxyalkanols.

7. The process of claim 6 in which the non-tertiary alcohol is methanol.

8. The process of claim 6 in which the non-tertiary alcohol is n-butanol.

9. The process of claim 6 in which the non-tertiary alcohol is lauryl alcohol.

10. The process of claim 6 in which the non-tertiary alcohol is cetyl alcohol.

11. The process of claim 6 in which the non-tertiary alcohol is benzyl alcohol.

References Cited in the file of this patent

UNITED STATES PATENTS

| | | |
|---|---|---|
| 2,579,412 | Adelman | Dec. 18, 1951 |
| 2,760,990 | Watanabe et al. | Aug. 28, 1956 |

OTHER REFERENCES

Booth et al.: Boron Trifluoride, pp. 170, 195 (1949).

Groggins; Unit Processes in Organic Synthesis, 4th edit., (1952), p. 814.

Adelman: Jour. Amer. Chem. Soc., vol. 77 (1955), pp. 1669–70.